US008135822B2

(12) United States Patent
Wu

(10) Patent No.: US 8,135,822 B2
(45) Date of Patent: Mar. 13, 2012

(54) REPORTING EVENTS FROM MULTIPLE WS-ENABLED DEVICES

(75) Inventor: Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 689 days.

(21) Appl. No.: 11/748,182

(22) Filed: May 14, 2007

(65) Prior Publication Data

US 2008/0285558 A1 Nov. 20, 2008

(51) Int. Cl.

| | |
|---|---|
| ***G06F 15/173*** | (2006.01) |
| ***G06F 15/16*** | (2006.01) |
| ***H04L 12/28*** | (2006.01) |
| ***H04B 17/00*** | (2006.01) |
| ***H04M 1/64*** | (2006.01) |

(52) U.S. Cl. ..... 709/224; 709/205; 370/254; 455/226.1; 379/76

(58) Field of Classification Search .................. 709/201, 709/217–224, 205; 379/76; 370/254; 455/226.1
See application file for complete search history.

(56) References Cited

U.S. PATENT DOCUMENTS 6,445,907 B1 * 9/2002 Middeke et al. ........... 455/226.1
6,922,465 B1 * 7/2005 Howe .............................. 379/76
2002/0169864 A1 * 11/2002 Sesek ............................ 709/223
2003/0191836 A1 * 10/2003 Murtha et al. ................ 709/224
2006/0259604 A1 * 11/2006 Kotchavi et al. .............. 709/223
2007/0078976 A1 * 4/2007 Taylor et al. .................. 709/224
2007/0294349 A1 * 12/2007 Chickering et al. .......... 709/205
2010/0061268 A1 * 3/2010 Nishio .......................... 370/254

OTHER PUBLICATIONS

"Network Printing" downloaded Jul. 25, 2007 from the Internet < http://www.networkprinting.info/print-servers.html > 2 pages.
"Network Connectivity" downloaded Jul. 25, 2007 from the Internet < http://www.intel.com/support/netport/vintage/sb/cs-015158.htm > 1 page.

* cited by examiner

*Primary Examiner* — Ian N Moore
*Assistant Examiner* — Kiet Tang
(74) *Attorney, Agent, or Firm* — Hickman Palermo Truong & Becker LLP; Daniel D. Ledesma

(57) ABSTRACT

Techniques for reporting events that occur on a plurality of Web Services (WS)-enabled devices are provided. A service agent executes on a node that is separate from the plurality of WS-enabled devices. The service agent receives an event notification message from a particular device of the plurality of WS-enabled devices. The event notification message indicates an event that occurred on the particular device. In response to receiving the event notification message, the service agent examines a mapping table that maps event types to one or more devices that are to be notified when the corresponding event occurs. The service agent then sends a message about the event to each of the one or more devices.

24 Claims, 3 Drawing Sheets

REPORTING EVENTS FROM MULTIPLE WS-ENABLED DEVICES

FIELD OF THE INVENTION

The present invention relates to Web Services-enabled devices, and more particularly to reporting events from multiple WS-enabled devices to remote clients.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In modern enterprise systems, time is critical. If a service provided by the enterprise system is down, then many other parts of the system, including users, suffer negative consequences as a result. For example, if a printer that provides printing services for an entire floor of employees fails, then any pending requests for the printer's services must wait. It is important that problems (or potential problems) with devices are reported immediately to the appropriate person(s) in order to mitigate the extent of the adverse consequences.

However, current mechanisms for reporting problem devices tend to require manual intervention. For example, if a printer runs out of ink, then a user that detects the problem must report the problem to the appropriate person(s), who may be unknown to the user.

Additionally, when an IT person finally arrives to fix the problem, the device (e.g., the printer) is many times already taken offline, which causes potentially important debug and diagnostic information to go missing.

Furthermore, the steps required to set up event notifications and discover important events require several manual steps.

Based on the foregoing, there is a need to efficiently and automatically report events of interest to the appropriate individuals.

SUMMARY

Techniques for reporting events of WS-enabled devices are provided. In one approach, a service agent executes on a node that is separate from a plurality of WS-enabled devices that each at least implement a WS eventing protocol. The service agent receives an event notification message from a particular device of the plurality of WS-enabled devices. The event notification message indicates an event that occurred on the particular device. In response to the event notification message, the service agent identifies one or more attributes of the event notification message to determine one or more network devices that are to be notified about the event notification message. The service agent then sends a message (that includes data about the event) to each of the one or more network devices.

In an approach, when a WS-enabled device is added to the network, the device sends a discovery message to all nodes in the network. The service agent receives the message and then requests the metadata of the newly added device. After receiving the metadata of the newly added device, the service agent subscribes for one or more events that may occur on the new device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Web Services

The term "Web services" describes a standardized way of integrating Web-based applications using the XML, SOAP, and WSDL standards over a networking protocol, such as IP. XML is used to tag the data, SOAP specifies how to encode a Web service request and response into an XML message, and WSDL is used for describing the services available. Web services are used for programmatic and networked entities to communicate with each other, regardless of the platform for their implementation. Because many such entities are business-related, Web services allow businesses to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for security, reliable messaging, and transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

Example Event Reporting Architecture

Figure 1:
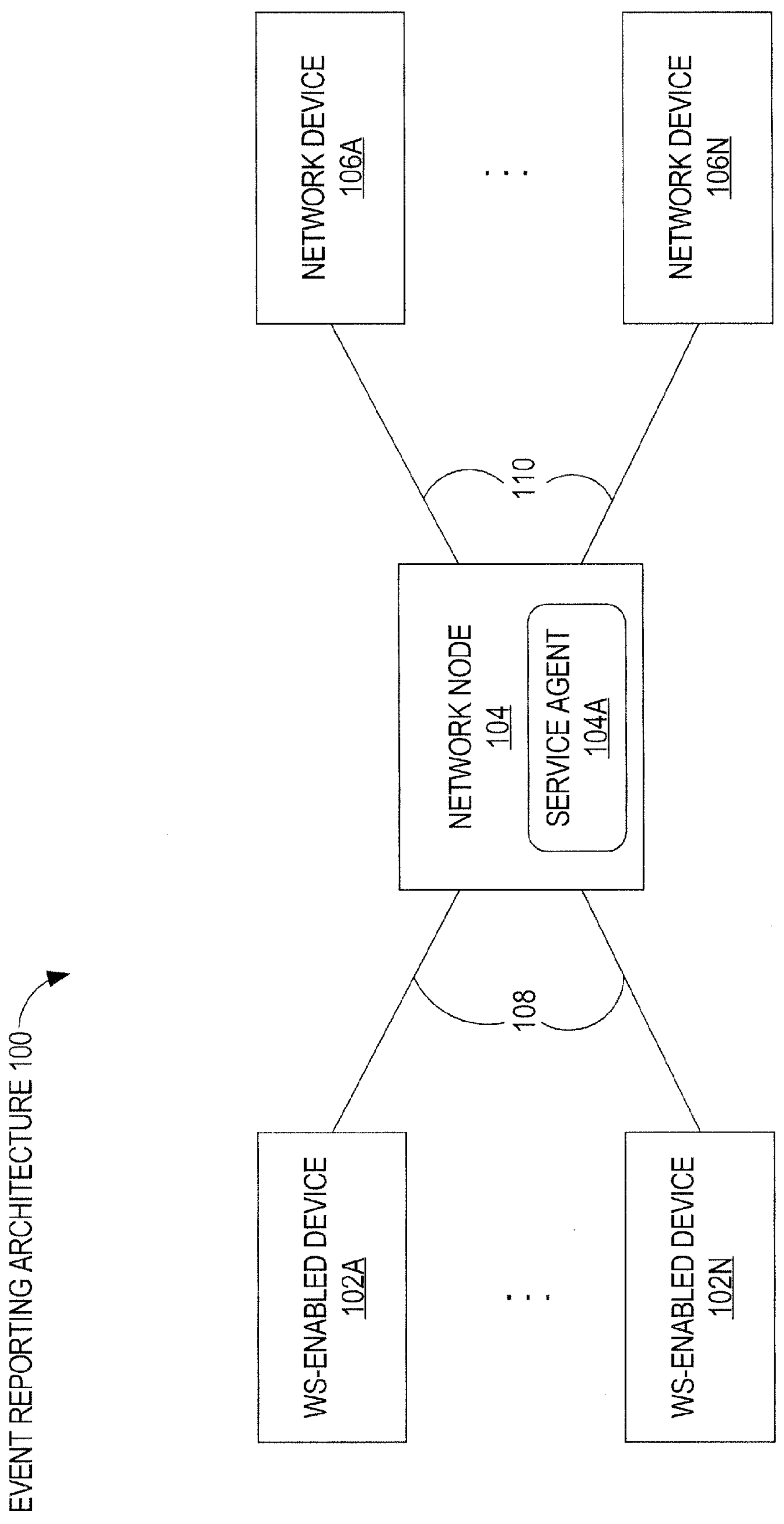
FIG. 1 is a block diagram that illustrates an example event reporting architecture for interaction between a service agent, multiple WS-enabled devices, and remote devices, according to an embodiment of the invention.

FIG. 1 is a block diagram that illustrates an example event reporting architecture 100 for interaction between a service agent 104A executing on a network node 104, multiple WS-enabled devices 102A-N, and multiple network devices 106A-N, according to an embodiment of the invention. Network node 104 is separate from WS-enabled devices 102A-N and network devices 106A-N. Network node 104 is communicatively coupled to WS-enabled devices 102A-N via communication links 108. Network node 104 is communicatively coupled to network devices 106A-N via communication links 110.

Communications links 108 may be implemented by any medium or mechanism that provides for the exchange of data between WS-enabled devices 102A-N and network node 104. Similarly, communications links 110 may be implemented by any medium or mechanism that provides for the exchange of data between network node 104 and network devices 106A-N. Examples of communications links 108 and 110 include, without limitation, a network such as a Local Area Network (LAN), Wide Area Network (WAN), Ethernet or the Internet, or one or more terrestrial, satellite, or wireless links.

WS-Enabled Device

In an embodiment, a WS-enabled device is a device that conforms to the Devices Profile for Web Services (DPWS) specification, which defines a minimal set of implementation constraints to enable secure Web Service messaging, discovery, description, and eventing on devices. DPWS builds on core Web Services standards, such as WSDL, XML Schema, SOAP, WS-Addressing, WS-MetadataExchange, WS-Transfer, WS-Policy, WS-Security, WS-Discovery, and WS-Eventing. The specification "Devices Profile for Web Services", February 2006, is incorporated by reference as if fully set forth herein.

In another embodiment, a WS-enabled device is a device that implements one or more Web Services protocols, at least one of which is a WS eventing protocol, such as WS-Eventing or WS-Notification.

A WS-enabled device may provide one or more services, which may include, without limitation, a print service, a scan service, a fax service, and an archive service. A device that provides more than one of such services is called a multi-functional peripheral (MFP). Therefore, for example, WS-enabled device 102A may a printer, a fax machine, a scanner, or an MFP.

Network Device

Network devices 106A-N may be any device that is capable of receiving messages over a network. Network devices 106A-N may be WS-enabled devices or non-WS-enabled devices. Non-limiting examples of network devices 106A-N include a desktop computer, a laptop computer, a cell phone, a fax machine, and a PDA.

Each device of network devices 106A-N is an intended recipient of notifications of one or more events that may occur on one or more of WS-enabled devices 102A-N.

Service Agent

Service agent 104A may be implemented in hardware circuitry, in computer software, or a combination of hardware circuitry and computer software and is not limited to a particular hardware or software implementation.

As FIG. 1 illustrates, service agent 104A resides on network node 104. However, service agent 104A may reside on a machine that is separate from network node 104. Network node 104 may be any type of network node. Non-limiting examples of network node 104 include a server computer, a router, and a gateway.

Service agent 104A is responsible for receiving event notifications from WS-enabled devices 102A-N and determining, based on one or more attributes of the event notifications, which of the network devices 106A-N are to be notified about the event notification messages. In this way, service agent 104A acts as a client of WS-enabled devices 102A-N. As used hereinafter, an "event notification" is a message that a WS-enabled device sends service agent 104A when a subscribed for event occurs on the WS-enabled device. Also as used hereinafter, a "notification message" is a message that service agent 104A sends a network device in response to service agent 104A receiving an event notification.

As used hereinafter, service agent 104A "sending" notification messages indicates that service agent 104A at least causes notification messages to be transmitted. Thus, service agent 104A is not required to communicate directly with network devices 106A-N or WS-enabled devices 102A-N. As described previously, service agent 104A may reside on a machine that is separate from network node 104. In that embodiment, service agent 104A may not send messages directly to or receive messages directly from WS-enabled devices 102A-N or network devices 106A-N.

Any mechanism to determine which network devices 106A-N should be sent notification messages may be used. One such way is through a mapping table. Table 1 is an example of a mapping table.

TABLE 1

| CONDITION TYPE | NETWORK DEVICE |
|---|---|
| ConsumableEmpty | IT Supply |
| FuserOverTemperature | IT Repair |
| Jam | IT Repair |
| InputSupplyLow | IT Supply |
| InterlockOpen | Admin Cell |

The column "Condition Type" of Table 1 includes different types of events that may occur at WS-enabled devices 102A-N. Some events may be common to all WS-enabled devices 102A-N and other events may be exclusive to a strict subset of WS-enabled devices 102A-N. For example, a "FuserOver-Temperature" event may occur at all WS-enabled devices 102A-N, whereas a "Jam" event may only occur at WS-enabled devices that have printing functionality.

The column "Network Device" of Table 1 may identify (1) a specific device, (2) a department, or (3) an individual responsible for handling the corresponding event. For example, a "Jam" event requires the "IT Repair" department, or a person associated with the "IT Repair" department to respond. Even if the column "Network Device" identifies a department or an individual, the column may also identify how to send a message to the department or individual. For example, the column may include an IP address of a device in a certain department or the phone number of an individual's cell phone.

Although each entry in the mapping table of Table 1 is associated with a single device/department/individual, multiple devices/departments/individuals may be identified. For example, in case of a "FuserOverTemperature" event, a "Admin Cell" number may be identified in addition to the "IT Repair" department.

A mapping table may be created and updated manually, or automatically, based on user input. For example, an administrative user of network node 104 may manually create and/or update a mapping table using a graphical user interface on network node 104. As another example, a user of another device, such as network device 106A, sends a request to an administrative user of network node 104 to authorize changes to entries in the mapping table that relate to the device. As another example, a user of another device, such as network device 106A, may manually create and/or update a mapping table and then send the mapping table and/or updates to service agent 104A. As yet another example, service agent 104A may accept as input a text file and automatically generate a mapping table based on the text file.

In an embodiment, an entry in a mapping table indicates only those WS-enabled devices 102A-N that are interesting to a user/administrator when the corresponding event occurs, regardless of the capability of other WS-enabled devices to generate that event. For example, WS-enable device 102A may be a printer where a "Jam" event may occur. However, an administrator may not care to be notified of that event from that printer because the printer is located next to the administrator who will immediately notice a paper jam without having to be notified of the jam from service agent 104A. Thus, the corresponding entry in the mapping table will not indicate WS-enabled device 102A. As a result, when a "Jam" event occurs at device 102A, service agent 104A identifies the proper entry in the mapping table for a "Jam" event but also determines that device 102A is not identified in that entry. Therefore, service agent 104A does not send a notification message to the "IT Repair" department.

In a related embodiment, an entry in a mapping table indicates which WS-enabled devices 102A-N to ignore when certain events at those devices occur. According to the above "Jam" event example, the corresponding entry in the mapping table indicates device 102A. As a result, when a "Jam" event occurs at device 102A, service agent 104A identifies the proper entry in the mapping table for a "Jam" event but also determines that device 102A is identified in that entry. Therefore, service agent 104A does not send a notification message to the "IT Repair" department.

In an embodiment, one or more of network devices 106A-N may communicate with service agent 104A to inform service agent 104A that the network device is unable to receive any messages at the location specified in the mapping table. For example, a network device may be a mobile device that is not reachable by the service agent 104A when the mobile device moves outside a particular range. The mobile device may provide (1) an alternative means to contact the mobile device (such as another IP address) or (2) an alternative device to notify when a notification message, indicating the occurrence of an event, is intended for the mobile device.

Sequence Diagram

Figure 2:
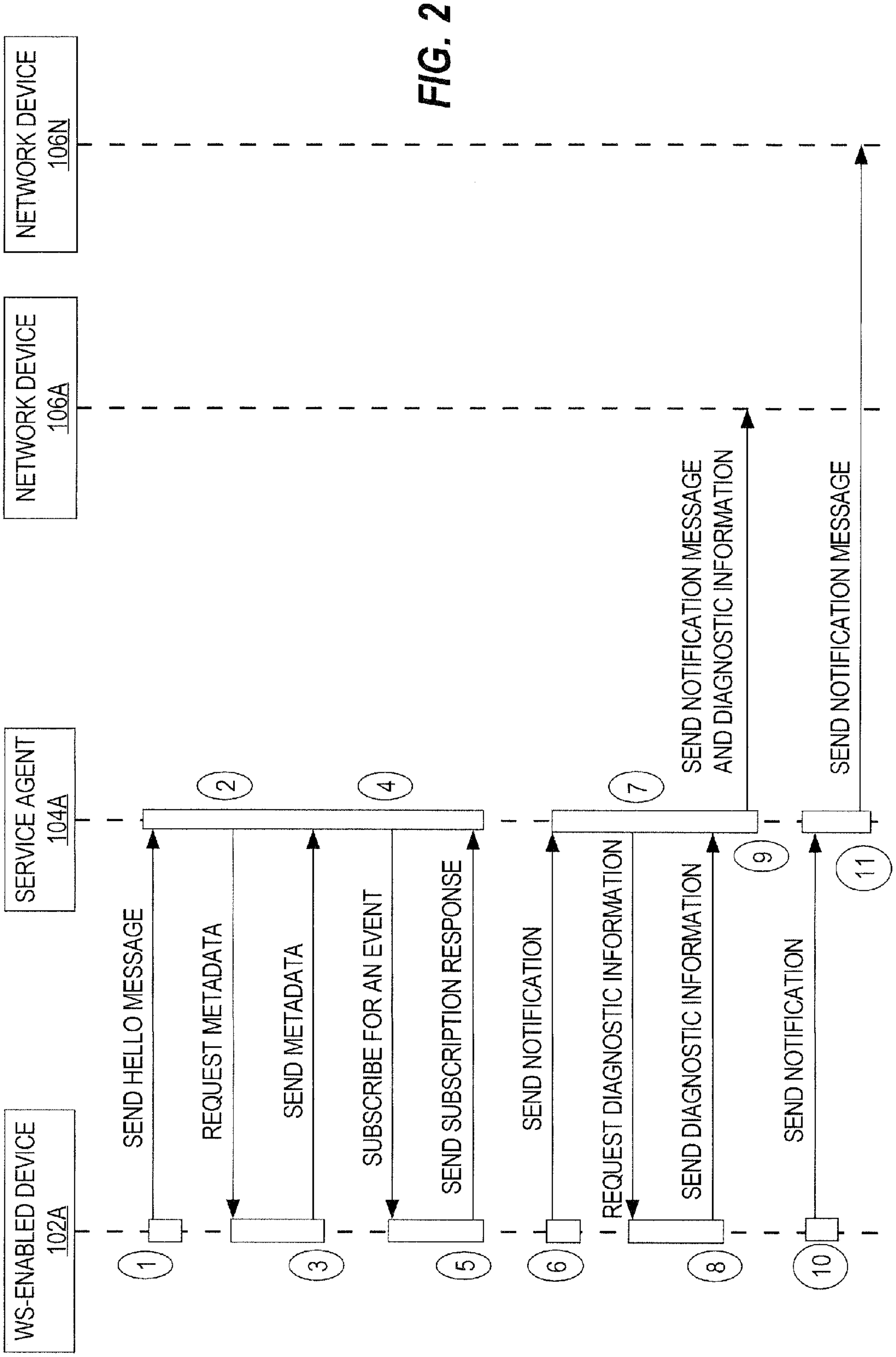
FIG. 2 is a sequence diagram that illustrates how each component in the example event reporting architecture communicates, according to an embodiment of the invention.

FIG. 2 is a sequence diagram that illustrates how each component in the example event reporting architecture communicates, according to an embodiment of the invention. At step 1, WS-enabled device 102A (referred to hereinafter as "device 102A) sends a "hello" discovery message to service agent 104A. The discovery message may be part of a broadcast or multicast discovery message that device 102A sends when device 102A is initially added to the network to which network node 104 is also connected. Alternatively, service agent 104A may send a broadcast or multicast discovery message periodically or in response to user input in order to discover WS-enabled devices that are newly added to the same network.

At step 2, service agent 104A sends a message to device 102A. The message indicates a request for the metadata of device 102A. Step 2 may be performed automatically in response to discovering device 102A.

At step 3, in response to the message, device 102A sends metadata of device 102A to service agent 104A. The metadata of a WS-enabled device describes what services that device provides and the specifications (or protocols) that device implements. As a client of WS-enabled devices 102A-N, service agent 104A should implement such specifications, or at least the eventing specification(s) in order to subscribe for events and understand the resulting notifications. Therefore, based on the metadata, service agent 104A may determine the event types device 102A supports. For example, device 102A may be a WSD printer that implements the Printer Control Profile defined by Microsoft. The Printer Control Profile defines all operations and event types a WSD printer supports. The metadata from device 102A would thus indicate that device 102A implements Printer Control Profile.

At step 4, service agent 104A sends a subscription request to device 102A. The subscription request indicates that service agent 104A intends to subscribe for one or more events that may occur at device 102A, particularly those events that are specified in the mapping table. Non-limiting examples of events for which a subscription may be made are specified in the "Condition Type" column of Table 1 above. Step 4 may be performed automatically, for example, (1) in response to the metadata response message of step 3, (2) in response to the creation of a mapping table, or (3) in response to an update to the mapping table, such as when an entry in the mapping table is added, deleted, or modified.

At step 5, in response to the subscription request and after properly handling the subscription request, device 102A sends a subscription response indicating a success or failure of the subscription request.

At step 6, if the event was successfully subscribed for, then device 102A sends an event notification, upon detection of an event's occurrence, to service agent 104A.

At step 7, if service agent 104A does not immediately notify (e.g., based on a mapping table) the appropriate network device(s), then service agent 104A may request diagnostic information from device 102A.

Diagnostic information may be useful to an administrator to identify the nature or cause of the event. Diagnostic information may be useful in some situations (such as in a FuserOverTemperature event) and not in other situations (such as when the paper tray is empty). Therefore, depending on the situation, service agent 104A may request diagnostic information when service agent 104A is notified of certain events but not request diagnostic information when notified of other events. In an embodiment, service agent 104A may determine whether to request diagnostic information by examining the entry, in the mapping table, that corresponds to the event notification in step 6. The entry may indicate whether to request diagnostic information from the device that sent the notification of the event. Alternatively, the determination to request diagnostic information may be based on which network devices 106A-N are to be notified of the event.

In a related embodiment, device 102A is configured to provide any diagnostic information to service agent 104A without requiring service agent 104A to specifically request the diagnostic information.

At step 8, in response to the diagnostic request, device 102A provides any diagnostic information about the event to service agent 104A.

At step 9, service agent 104A sends (1) a notification message that includes data about the event and (2) diagnostic information to one or more network devices, such as device 106A.

At step 10, device 102A sends a second event notification of a second event to service agent 104A. The second event may or may not be the same type of event as the first event (in step 6). The entry in a mapping table corresponding to the second event may indicate (1) that diagnostic information is not necessary or possible for the second event or (2) that the corresponding network device does not require any diagnostic information.

Accordingly, at step 11, service agent 104A sends a second notification message that includes data about the second event to one or more network devices, such as device 106N.

Implementation Mechanisms

Figure 3:
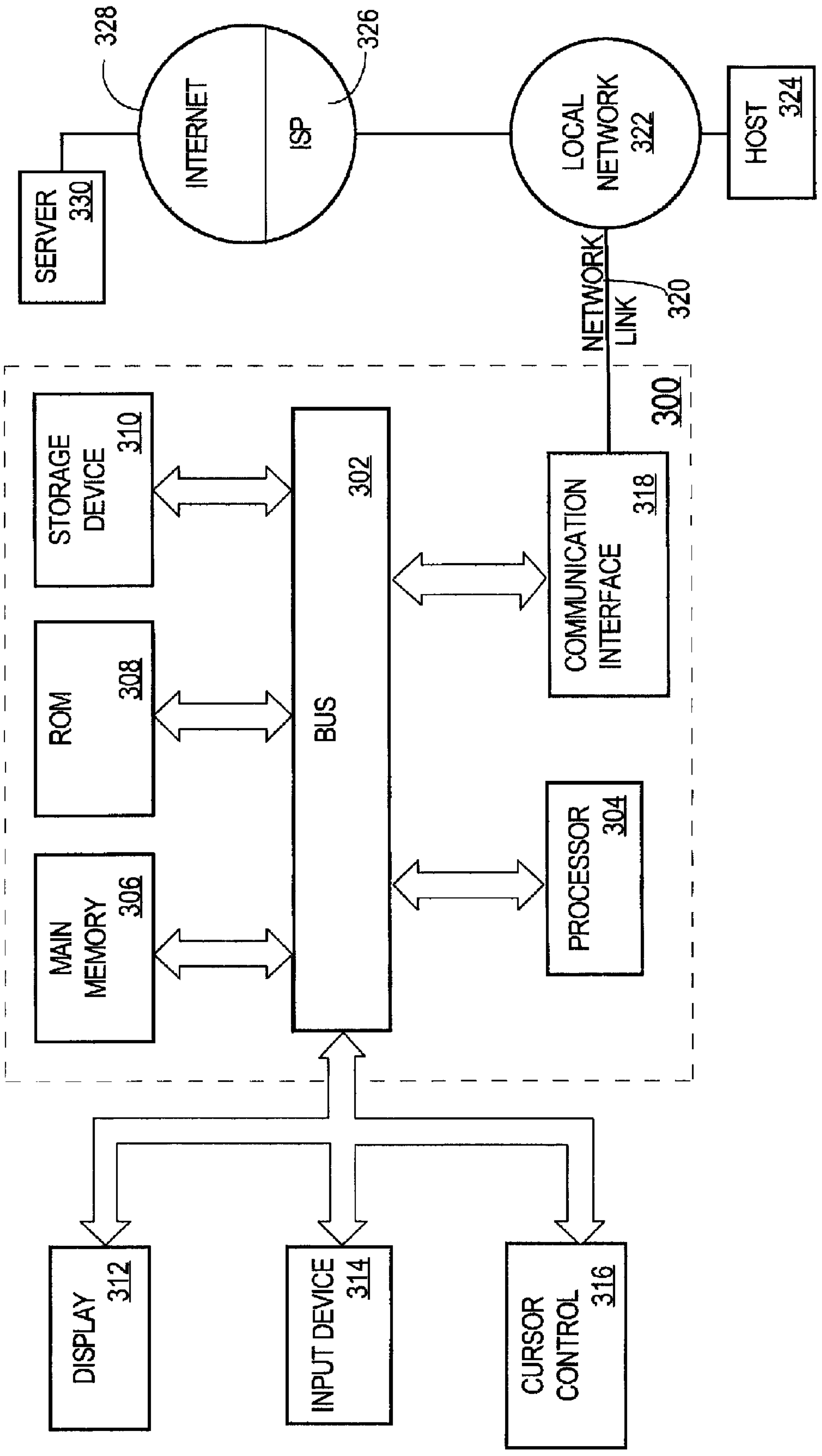
FIG. 3 is a block diagram that illustrates a computer system upon which an embodiment of the invention may be implemented.

The approaches described herein may be implemented on any type of computing platform or architecture. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of reporting events that occurred on a plurality of WS-enabled devices, the method comprising:

executing a service agent on a node that is separate from the plurality of WS-enabled devices;

causing to be transmitted, by the service agent, over a network, to a first WS-enabled device of the plurality of WS-enabled devices, a first subscription request that indicates one or more events, that may occur at the first WS-enabled device, for which the service agent is to be notified on behalf of one or more first network devices;

receiving, by the service agent, from the first WS-enabled device, a first response that indicates that the first subscription request was properly processed at the first WS-enabled device;

causing to be transmitted, by the service agent, over the network, to a second WS-enabled device of the plurality of WS-enabled devices, a second subscription request that indicates one or more events, that may occur at the second WS-enabled device, for which the service agent is to be notified on behalf of one or more second network devices that are different than the one or more first network devices;

receiving, by the service agent, from the second WS-enabled device, a second response that indicates that the second subscription request was properly processed at the second WS-enabled device;

after receiving the first response, receiving, by the service agent, over the network, a first event notification message from the first WS-enabled device, wherein the first event notification message indicates a first event that occurred on the first WS-enabled device, wherein the first event is of a first type;

in response to receiving the first event notification message, determining, by the service agent, based at least upon the first event being of the first type, the one or more first network devices that are to be notified about the first event notification message;

causing to be transmitted, by the service agent, over the network, a first message to each of the one or more first network devices, wherein the first message includes data about the first event;

after receiving the second response, receiving, by the service agent, over the network, a second event notification message from the second WS-enabled device, wherein the second event notification message indicates a second event that occurred on the second WS-enabled device, wherein the second event is of a second type that is different than the first type;

in response to receiving the second event notification message, determining, by the service agent, based at least upon the second event being of the second type, the one or more second network devices that are to be notified about the second event notification message; and causing to be transmitted, by the service agent, over the network, a second message to each of the one or more second network devices, wherein the second message includes data about the second event.

2. The method of claim 1, further comprising, prior to receiving any event notification message from the first WS-enabled device:

the service agent receiving, from the first WS-enabled device, a discovery message that indicates how to communicate with the first WS-enabled device;

in response to the discovery message, the service agent causing to be transmitted, to the first WS-enabled device, a request for metadata of the first WS-enabled device; and the service agent receiving the metadata from the first WS-enabled device, wherein the metadata describes one or more services provided by the first WS-enabled device and indicates one or more protocols that the first WS-enabled device implements.

3. The method of claim 1, wherein:

the service agent determining the one or more first network devices includes the service agent using a plurality of mappings; and each mapping of the plurality of mappings associates (1) an event that may occur at one or more of the plurality of WS-enabled devices with (2) one or more of a plurality of network devices that are to notified if the corresponding event occurs.

4. The method of claim 3, wherein each mapping of the plurality of mappings is configurable by at least one of (a) a user of the node or (b) a user of at least one of the plurality of network devices.

5. The method of claim 1, wherein the first message that is transmitted to each of the one or more first network devices includes second data that distinguishes the first WS-enabled device from the other devices of the plurality of WS-enabled devices.

6. The method of claim 1, further comprising:

the service agent receiving, from the first WS-enabled device, diagnostic information about the first event; and the service agent causing the diagnostic information to be transmitted to each of the one or more first network devices.

7. The method of claim 6, further comprising:

in response to the service agent receiving the first event notification message, the service agent causing to be transmitted, to the first WS-enabled device, a request for the diagnostic information;

wherein the diagnostic information is received in response to the request.

8. A volatile or non-volatile machine-readable storage medium for reporting events that occurred on a plurality of WS-enabled devices, the volatile or non-volatile machine-readable medium storing instructions which, when processed by one or more processors, causes performance of the steps of:

executing a service agent on a node that is separate from the plurality of WS-enabled devices;

causing to be transmitted, by the service agent, over a network, to a first WS-enabled device of the plurality of WS-enabled devices, a first subscription request that indicates one or more events, that may occur at the first WS-enabled device, for which the service agent is to be notified on behalf of one or more first network devices;

receiving, by the service agent, from the first WS-enabled device, a first response that indicates that the first subscription request was properly processed at the first WS-enabled device;

causing to be transmitted, by the service agent, over the network, to a second WS-enabled device of the plurality of WS-enabled devices, a second subscription request that indicates one or more events, that may occur at the second WS-enabled device, for which the service agent is to be notified on behalf of one or more second network devices that are different than the one or more first network devices;

receiving, by the service agent, from the second WS-enabled device, a second response that indicates that the second subscription request was properly processed at the second WS-enabled device;

after receiving the first response, receiving, by the service agent, over the network, a first event notification message from the first WS-enabled device, wherein the first event notification message indicates a first event that occurred on the first WS-enabled device, wherein the first event is of a first type;

in response to receiving the first event notification message, determining, by the service agent, based at least upon the first event being of the first type, one or more first network devices that are to be notified about the first event notification message;

causing to be transmitted, by the service agent, over the network, a first message to each of the one or more first network devices, wherein the first message includes data about the first event;

after receiving the second response, receiving, by the service agent, over the network, a second event notification message from the second WS-enabled device, wherein the second event notification message indicates a second event that occurred on the second WS-enabled device, wherein the second event is of a second type that is different than the first type;

in response to receiving the second event notification message, determining, by the service agent, based at least upon the second event being of the second type, one or more second network devices that are to be notified about the second event notification message; and causing to be transmitted, by the service agent, over the network, a second message to each of the one or more second network devices, wherein the second message includes data about the second event.

9. The volatile or non-volatile machine-readable storage medium of claim 8, wherein the instructions, when processed by the one or more processors, further causes, prior to receiving any event notification message from the first WS-enabled device:

the service agent receiving, from the WS-enabled first device, a discovery message that indicates how to communicate with the first WS-enabled device;

in response to the discovery message, the service agent causing to be transmitted, to the first WS-enabled device, a request for metadata of the first WS-enabled device; and the service agent receiving the metadata from the first WS-enabled device, wherein the metadata describes one or more services provided by the first WS-enabled device and indicates one or more protocols that the first WS-enabled device implements.

10. The volatile or non-volatile machine-readable storage medium of claim 8, wherein:

the service agent determining the one or more first network devices includes the service agent using a plurality of mappings; and each mapping of the plurality of mappings associates (1) an event that may occur at one or more of the plurality of WS-enabled devices with (2) one or more of a plurality of network devices that are to notified if the corresponding event occurs.

11. The volatile or non-volatile machine-readable storage medium of claim 10, wherein each mapping of the plurality of mappings is configurable by at least one of (a) a user of the node or (b) a user of at least one of the plurality of network devices.

12. The volatile or non-volatile machine-readable storage medium of claim 8, wherein the first message that is transmitted to each of the one or more first network devices includes second data that distinguishes the first device from the other devices of the plurality of WS-enabled devices.

13. The volatile or non-volatile machine-readable storage medium of claim 8, wherein the instructions, when processed by the one or more processors, further causes:

the service agent receiving, from the first WS-enabled device, diagnostic information about the first event; and the service agent causing the diagnostic information to be transmitted to each of the one or more first network devices.

14. The volatile or non-volatile machine-readable storage medium of claim 13, wherein the instructions, when processed by the one or more processors, further causes:

in response to the service agent receiving the first event notification message, the service agent causing to be transmitted, to the first WS-enabled device, a request for the diagnostic information;

wherein the diagnostic information is received in response to the request.

15. A network node for reporting events that occurred on a plurality of WS-enabled devices, wherein the network node is separate from the plurality of WS-enabled devices, the network node comprising:

one or more processors;

one or more machine-readable media storing instructions which, when executed by the one or more processors, cause:

transmitting, over a network, to a first WS-enabled device of the plurality of WS-enabled devices, a first subscription request that indicates one or more events, that may occur at the first WS-enabled device, for which the service agent is to be notified on behalf of one or more first network devices;

receiving, from the first WS-enabled device, a first response that indicates that the first subscription request was properly processed at the first WS-enabled device;

transmitting, over the network, to a second WS-enabled device of the plurality of WS-enabled devices, a second subscription request that indicates one or more events, that may occur at the second WS-enabled device, for which the service agent is to be notified on behalf of one or more second network devices that are different than the one or more first network devices;

receiving, from the second WS-enabled device, a second response that indicates that the second subscription request was properly processed at the second WS-enabled device;

after receiving the first response, receiving, over the network, a first event notification message from the first device, wherein the first event notification message indicates a first event that occurred on the first WS-enabled device, wherein the first event is of a first type;

in response to receiving the first event notification message, determining, based at least upon the first event being of the first type, one or more first network devices that are to be notified about the first event notification message;

causing to be transmitted, over the network, a first message to each of the one or more first network devices, wherein the first message includes data about the first event;

after receiving the second response, receiving, over the network, a second event notification message from the second WS-enabled device, wherein the second event notification message indicates a second event that occurred on the second WS-enabled device, wherein the second event is of a second type that is different than the first type;

in response to receiving the second event notification message, determining, based at least upon the second event being of the second type, one or more second network devices that are to be notified about the second event notification message; and causing to be transmitted, over the network, a second message to each of the one or more second network devices, wherein the second message includes data about the second event.

16. The network node of claim 15, wherein the instructions, when executed by the one or more processors, further cause, prior to receiving any event notification message from the first WS-enabled device:

receiving, from the first WS-enabled device, a discovery message that indicates how to communicate with the first WS-enabled device;

in response to the discovery message, receiving to be transmitted, to the first WS-enabled device, a request for metadata of the first WS-enabled device; and receiving the metadata from the first WS-enabled device, wherein the metadata describes one or more services provided by the first WS-enabled device and indicates one or more protocols that the first WS-enabled device implements.

17. The network node of claim 15, wherein:

determining the one or more first network devices includes using a plurality of mappings; and each mapping of the plurality of mappings associates (1) a possible event that may occur at one or more of the plurality of WS-enabled devices with (2) one or more of a plurality of network devices that are to notified if the corresponding possible event occurs.

18. The network node of claim 17, wherein each mapping of the plurality of mappings is configurable by at least one of (a) a user of the node or (b) a user of at least one of the plurality of network devices.

19. The network node of claim 15, wherein the first message that is transmitted to each of the one or more first network devices includes second data that distinguishes the first WS-enabled device from the other devices of the plurality of WS-enabled devices.

20. The network node of claim 15, wherein the instructions, when executed by the one or more processors, further cause:

receiving, from the first WS-enabled device, diagnostic information about the first event; and causing the diagnostic information to be transmitted to each of the one or more first network devices.

21. The network node of claim 19, wherein the instructions, when executed by the one or more processors, further cause:

in response to the first event notification message, causing to be transmitted, to the first WS-enabled device, a request for the diagnostic information;

wherein the diagnostic information is received in response to the request.

22. The method of claim 7, further comprising, prior to causing the request for diagnostic information to be transmitted, the service agent, in response to receiving the first event notification, determining whether to request diagnostic information from the first WS-enabled device, wherein causing the request to be transmitted to the first WS-enabled device is performed in response to determining to request diagnostic information from the first WS-enabled device.

23. The volatile or non-volatile machine-readable storage medium of claim 14, wherein the instructions, when executed by the one or more processors, further cause, prior to causing the request for diagnostic information to be transmitted, the service agent, in response to receiving the first event notification, determining whether to request diagnostic information from the first WS-enabled device, wherein causing the request to be transmitted to the first WS-enabled device is performed in response to determining to request diagnostic information from the first first WS-enabled device.

24. The network node of claim 21, wherein the instructions, when executed by the one or more processors, further cause, prior to causing the request for diagnostic information to be transmitted, the service agent, in response to receiving the first event notification, determining whether to request diagnostic information from the first WS-enabled device, wherein causing the request to be transmitted to the first WS-enabled device is performed in response to determining to request diagnostic information from the first WS-enabled device.

* * * * *